United States Patent
Brockmanns

(10) Patent No.: US 9,120,291 B2
(45) Date of Patent: Sep. 1, 2015

(54) METHOD FOR PRODUCING A TEXTILE SEMI-FINISHED PRODUCT AND TEXTILE SEMI-FINISHED PRODUCT FOR A TEXTILE FIBER COMPOSITE STRUCTURE

(75) Inventor: Irene Brockmanns, Willich (DE)

(73) Assignee: F.A. Kümpers GmbH & Co. KG, Rheine (DE)

( * ) Notice: Subject to any disclaimer, the term of this patent is extended or adjusted under 35 U.S.C. 154(b) by 86 days.

(21) Appl. No.: 14/114,928

(22) PCT Filed: May 6, 2011

(86) PCT No.: PCT/EP2011/002277
§ 371 (c)(1),
(2), (4) Date: Oct. 31, 2013

(87) PCT Pub. No.: WO2012/152296
PCT Pub. Date: Nov. 15, 2012

(65) Prior Publication Data
US 2014/0065342 A1    Mar. 6, 2014

(51) Int. Cl.
*B32B 3/16*    (2006.01)
*B29C 70/20*    (2006.01)
*D04H 1/62*    (2006.01)
*D04H 1/70*    (2012.01)

(52) U.S. Cl.
CPC ................. *B32B 3/16* (2013.01); *B29C 70/205* (2013.01); *D04H 1/62* (2013.01); *D04H 1/70* (2013.01); *Y10T 156/10* (2015.01); *Y10T 428/187* (2015.01)

(58) Field of Classification Search
CPC ........ B32B 3/16; B29C 70/30; B29C 70/543; D04H 1/62; Y10T 428/187; Y10T 156/10
USPC .......................................... 428/48, 47; 156/60
See application file for complete search history.

(56) References Cited

U.S. PATENT DOCUMENTS

| 5,198,281 A | 3/1993 | Muzzy et al. |
| 7,422,991 B2 | 9/2008 | Baldauf et al. |
| 7,704,901 B2 | 4/2010 | Baldauf et al. |
| 2010/0084098 A1 | 4/2010 | Meyer et al. |

FOREIGN PATENT DOCUMENTS

DE    19726831 A1    1/1999
(Continued)

OTHER PUBLICATIONS

International Search Report—PCT/EP2011/002277.

*Primary Examiner* — Alexander Thomas
(74) *Attorney, Agent, or Firm* — Nelson Mullins Riley & Scarborough LLP

(57) ABSTRACT

A textile semi-finished product for a textile fiber composite structure is produced by a method wherein roving pieces (2, 4, 7, 10, 11, 12) with a defined length and width are deposited at a defined position depending on the end product and overlapping. The roving pieces (2, 4, 7, 10, 11, 12) are arranged and fixed with one end at a defined angle to a reference axis adjacent to one another on a plastically deformable flat carrier material (1, 6). After depositing a first row of roving pieces (2, 4, 7, 10, 11, 12), the depositing of the roving pieces (2, 4, 7, 10, 11, 12) in following rows takes place such that the ends of the roving pieces that are in each case not connected to the carrier material (1, 6) overlap the previously deposited roving pieces (2, 4, 7, 10, 11, 12) in the manner of roof tiles or scales, the roving pieces not being connected to one another to ensure a mutual displaceability.

10 Claims, 3 Drawing Sheets

(56) References Cited

FOREIGN PATENT DOCUMENTS

| DE | 10301646 | A1 | 7/2004 |
|---|---|---|---|
| DE | 10005202 | B4 | 3/2007 |
| DE | 102007012609 | A1 | 9/2008 |
| DE | 102007024124 | B3 | 4/2009 |
| EP | 1736306 | A1 | 12/2006 |
| GB | 2268699 | A | 1/1994 |

METHOD FOR PRODUCING A TEXTILE SEMI-FINISHED PRODUCT AND TEXTILE SEMI-FINISHED PRODUCT FOR A TEXTILE FIBER COMPOSITE STRUCTURE

CROSS-REFERENCE TO RELATED APPLICATION

This application claims the benefit of International Patent Cooperation Treaty Patent Application No. PCT/EP2011/002277, filed May 6, 2011, herein incorporated by reference.

FIELD OF THE INVENTION

The invention relates to a method for producing a textile semi-finished product for a textile fiber composite structure, which substantially consists of roving pieces with a defined length and width, the roving pieces being deposited at a defined position depending on the end product and overlapping, as well as a textile semi-finished product.

BACKGROUND OF THE INVENTION

During the construction of vehicles of all types, also, for example, for wind power stations, the requirement for loadable and nevertheless lightweight materials that are as economical as possible is increasing. In particular, fiber composite materials provide an excellent lightweight construction potential. The principle is that, in particular, high-strength and rigid fibers are embedded in a matrix so as to be adapted to the stresses, whereby components with excellent mechanical properties are produced, which are typically 25% lighter than aluminium and 50% lighter than steel structures with comparable performance.

In order to produce fiber composite structures with fibers arranged in accordance with the force flow, so-called preforms have been manufactured as textile semi-finished products for selected applications. These are generally two-dimensional or three-dimensional structures with a fiber orientation designed to be adapted to the stresses.

For example from German Patent Publications DE 100 05 202 B4 or DE 197 26 831 C2, it is known to lay endless thread sheets successively one above the other in their later load directions and to connect them to form a finished preform by a connecting method, such as, for example, sewing in a so-called multi-axial machine.

In a multi-axial machine that has become known from German Patent Publication DE 10 2007 024 124 B3, endless threads are both laid alternately around rows of hooks on transport chains running longitudinally on both sides and also the width of the cut-to-length thread sheets bridging the web of material is temporarily fixed to the transport chains by means of clamping fastenings.

To produce complex preforms, these textile structures are cut to size separately and joined to form thicker packages in a subsequent process, before they are formed into a finished composite component, for example by means of a resin injection process.

In particular, in the case of components, in which curved force flow lines with a varying density are to be expected, it is not possible to produce a corresponding component designed to be adapted to the force flow using the known methods.

A fiber or thread composite has become known from German Patent Publication DE 103 01 646 A1, in which strand pieces are deposited one above the other in a plurality of layers in various depositing patterns and are glued to one another. Although this improves the depositing adapted to the force flow, and the drapeability is improved to a certain extent, this is, however, also not suitable for greater deformations owing to the compact design.

It has therefore been proposed in German Patent Publication DE 10 2007 012 609 A1, to spread rovings apart and to divide them into pieces with a defined length and width, after which these roving pieces are pressed by means of a special laying device with a resiliently deformable surface flat onto a three-dimensional forming area. These roving pieces are fixed by means of a binder material on the three-dimensional forming area. The distribution of the roving pieces on the three-dimensional forming area takes place in such a way that these are placed and fixed at predefined positions. When using a thermally activatable binder, it has proven to be advantageous to attach a heating device to the laying head and to heat the fiber band piece during transportation to the depositing site, whereby the binder is activated.

As an alternative to this type of thermal fixing, it is described in Great Britain Patent Publication GB 2 268 699 A, that a plate that is spatially deformable by a large number of adjustable supports can be used as a tool for shaping plastic material webs, the heating device being integrated in the tool to fix the spatial shape.

Compared to the remaining prior art, a substantially better adaptation of the stretching of the rovings in the direction of the force flow lines in the fiber composite structure is achieved by the invention of German Patent Publication DE 10 2007 012 609 A1. However, it is disadvantageous that a very complex laying device with a plurality of degrees of freedom is necessary for the depositing adapted in each case to the respective three-dimensional forming area, of the roving pieces. A laying device of this type is not only very expensive because of its complexity, but also very laborious to program and extremely limited with respect to productivity. It is therefore suitable, in particular, for complicated structures and small piece numbers. In the case of larger piece numbers and larger areas, a device of this type cannot be used.

SUMMARY OF THE INVENTION

It is therefore the object of the invention to propose a method for producing a textile semi-finished product for a textile fiber composite structure, which, despite significantly increased productivity, in particular also for three-dimensional applications, is to ensure an arrangement of the fiber structures substantially adapted to the force flow, as well as a corresponding textile semi-finished product.

This object is achieved by a method for producing a textile semi-finished product for a textile fiber composite structure, which substantially consists of roving pieces with a defined length and width, the roving pieces being deposited at a defined position depending on the end product and overlapping. The method is characterized in that the roving pieces, are arranged and fixed with one end at a defined angle to a reference axis adjacent to one another on a plastically deformable flat carrier material. After a depositing of this type of a first row of roving pieces, in rows following this, the depositing of the roving pieces takes place in such a way that the ends of the roving pieces that are in each case not connected to the carrier material overlap the previously deposited roving pieces in the manner of roof tiles or scales, the roving pieces not being connected to one another to ensure a mutual displaceability.

The object of the invention is further achieved by providing a textile semi-finished product for a textile fiber composite structure, which substantially consists of roving pieces with a defined length and width, the roving pieces being deposited at a defined position depending on the end product and overlapping. The product is characterized in that the roving pieces are arranged at a defined angle to a reference axis adjacent to one another in rows, in each case, and are fixed by one end on a plastically deformable flat carrier material. The roving pieces of the adjacent rows are deposited in such a way that ends of the roving pieces in each case not connected to the carrier material overlap the roving pieces of the adjacent rows in the manner of roof tiles or scales without mutual fixing.

Further advantageous developments are described more fully hereinfter.

In contrast to the prior art, the roving pieces are not deposited on a three-dimensional forming area, which corresponds to their later use, but arranged adjacent to one another on a plastically deformable flat, in other words, two-dimensional, carrier material at a defined angle to a reference axis and fixed only by one end. The arrangement in consecutive rows takes place in such a way that ends of the roving pieces not connected to the carrier material in each case overlap the previously deposited roving pieces in the manner of roof tiles or scales. The fastening of the roving pieces only at one end on the carrier material is used merely for fixing to the carrier material, but, in a later deforming or draping process of the carrier material, allows a virtually unlimited displacement between the overlapping roving pieces. This displacement can take place by extending the carrier material in the longitudinal direction of the roving pieces, but also by a change in the angular position of each individual roving piece depending on the form in which the draping takes place.

The fastening of the roving pieces by their one end on the carrier material can take place in different ways. An advantageous solution is that the carrier material itself has adhesive properties, which are already sufficient to fix the roving pieces in such a way that the connection during the later draping and also during the resin impregnation process is not released. These adhesive properties of the surface of the carrier material can be achieved, in particular, by thermal activation of a binder.

Alternatively, it is also possible, to adhesively equip the roving pieces themselves in the region, in which they come into contact with the carrier material. This adhesive equipping may, for example, be only at points, in order to ensure the required flexibility of this connection for the later draping process.

Owing to the adhesive equipping of the carrier material or the roving pieces only at their one end, no connection is produced between the roving pieces, so a virtually free mobility is ensured during the draping.

It is particularly advantageous to select the arrangement of the roving pieces before the draping on the carrier material after corresponding prior calculation, such that they adopt, after the draping, their optimised position with respect to the provided force flow in the end product. Instead of a prior calculation, models can also, however, be set up, wherein they starting position and orientation of the roving pieces for their optimal orientation in the three-dimensional structure are successively recreated by iteration and stored as models. This model can then be used repeatedly for the same products or else modified for similar components by a few tests.

At this point, it should also be pointed out that the term contained in the claims, a "row" of roving pieces is not only limited to a straight arrangement of roving pieces next to one another, but also comprises virtually any other staggered arrangements, as shown, by way of example, in the embodiments. The invention is also not limited to the use of roving pieces of equal length. The length of the rovings can be correspondingly selected depending on the desired layer thickness or the number of rovings located one above the other in, the section. For example, long rovings with a fixing zone of the same width produce a larger number of overlaps than shorter rovings.

Basically, the advantages of the invention can be used even in two-dimensional applications and are considered to be expressly also included by the invention. Thus the area produced according to the invention can be converted by two-dimensional deforming into a changed area form or size and, in each case, adapted according to the deforming direction with respect to the orientation of the rovings to the later force flow direction.

BRIEF DESCRIPTION OF THE DRAWINGS

The invention will be described in more detail below with the aid of embodiments.

DETAILED DESCRIPTION OF THE PREFERRED EMBODIMENTS

Figure 1:
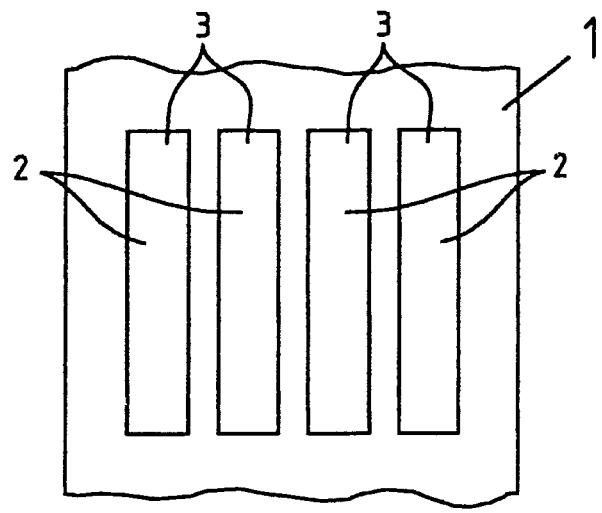
FIG. 1 shows a portion of the carrier material with a row of roving pieces.

FIG. 1 shows a web-like carrier material 1 in the form of a carrier web portion, on which roving pieces 2 are arranged in a first row and have a fixing region 3, in which they are connected to the carrier material 1. The roving pieces 2 have adhesive properties limited to the fixing region 3 here. Alternatively, the web-like carrier material 1 could itself have adhesive properties. Correspondingly, in the present example, the roving pieces 2 would then be connected over the entire surface to the web-like carrier material 1. If, this was not desired, which in any case would only be limited to the first row, the web-like carrier material could be separated below the fixing regions 3, or would have no adhesive properties in this end region. Further rows of roving pieces 2 would be further constructed over the row shown here and then correspondingly overlap the roving pieces 2 of the first row, as shown, for example, in FIGS. 4 and 5. Whether and by what amount the roving pieces are spaced apart from one another within each row, depends on the later desired properties. However, it is advantageous in the case of the spacing, to not equip the carrier with the adhesive properties, as in this case, roving rows located thereabove could also stick to the carrier material.

Figure 2:
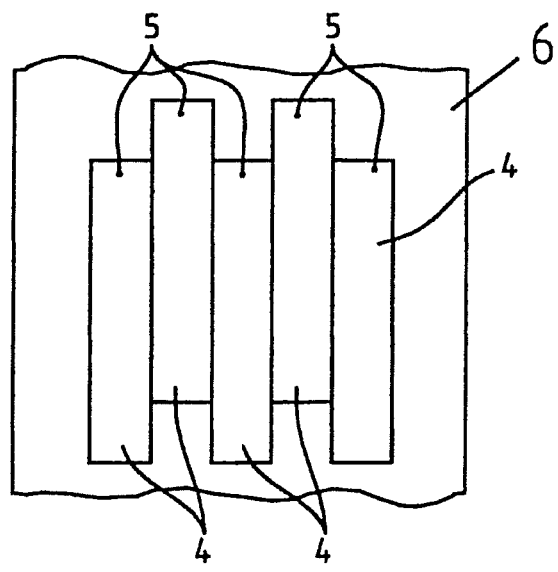
FIG. 2 shows carrier material with a stepped arrangement of roving pieces.

It is demonstrated in FIG. 2 that the arrangement of roving pieces 4 on the web-like carrier material can also be alternating. 5 indicates the fixing points here, which can consist of a point-like adhesive arrangement on the carrier material 1 or the roving pieces 4, or may, for example, also be formed in the scope of the invention by a stitching.

Figure 3:
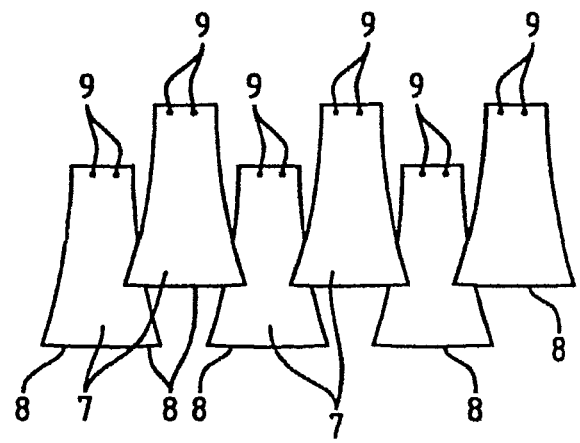
FIG. 3 shows an arrangement of roving pieces with a spreading out at the end.

FIG. 3 shows an arrangement of roving pieces 7 corresponding substantially to FIG. 2, said roving pieces additionally being spread apart in their end region 8. This spreading apart has the advantage that the graduations of the ends of the roving pieces 7 cannot be seen in the end product. The fixing of the roving pieces 7 takes place here, in each case, by means of two fixing points. This fixing also allows in the later shaping a substantial mobility of the roving pieces 7 on the carrier material.

Figure 4:
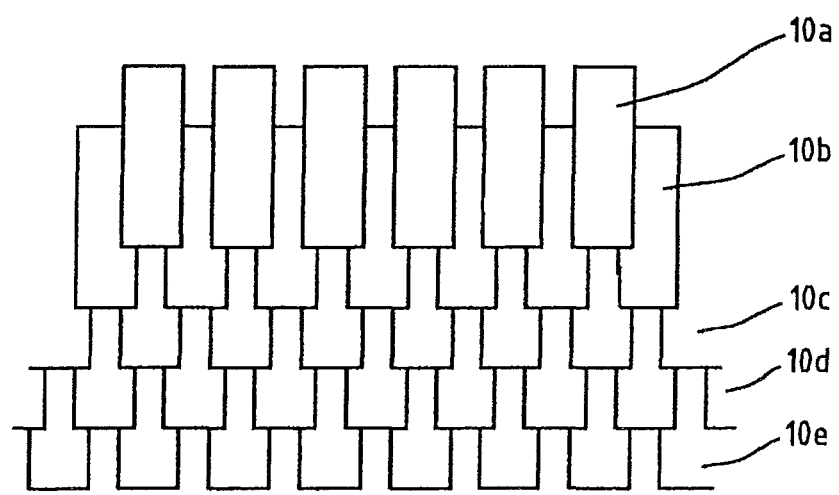
FIG. 4 shows a roof tile-like arrangement of a plurality of roving rows.

FIG. 4 shows a plurality of rows 10a to 10e of roving pieces, which overlap in the manner of roof tiles.

Figure 5:
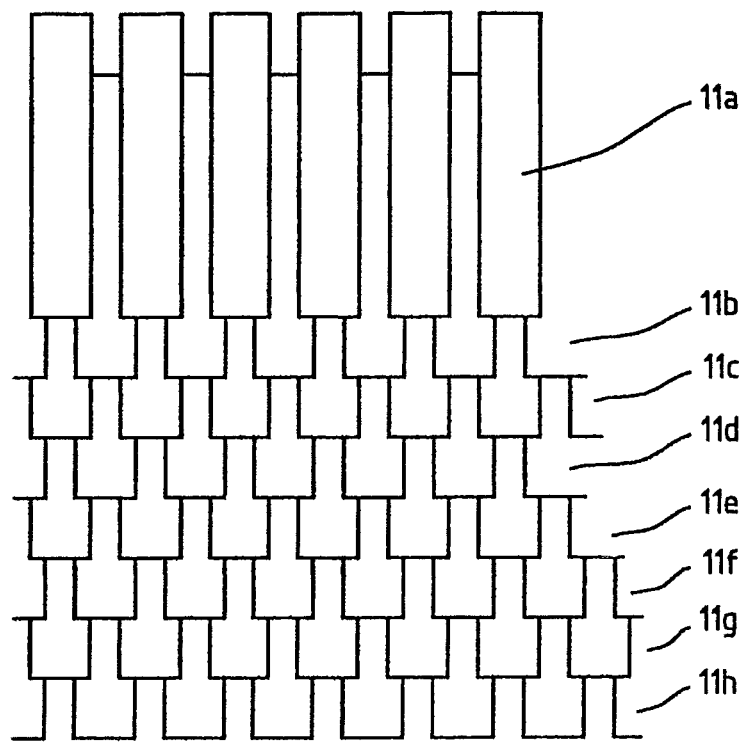
FIG. 5 also shows a roof tile-like arrangement of roving rows, but with a greater overlap

In comparison to this it can be seen that the roving pieces 11a to 11h in FIG. 5 overlap significantly more because of their length than the roving pieces 10a to 10e in FIG. 4. It is in each case assumed here that the end regions of the rovings, with which they are fixed on the carrier material, have approximately the same dimension.

It is to be made clear by the view in FIGS. 4 and 5 that textile semi-finished products can be produced in one step owing to the construction according to the invention, said semi-finished products substantially differing from one another with respect to their thickness because of the layering.

Figure 6:
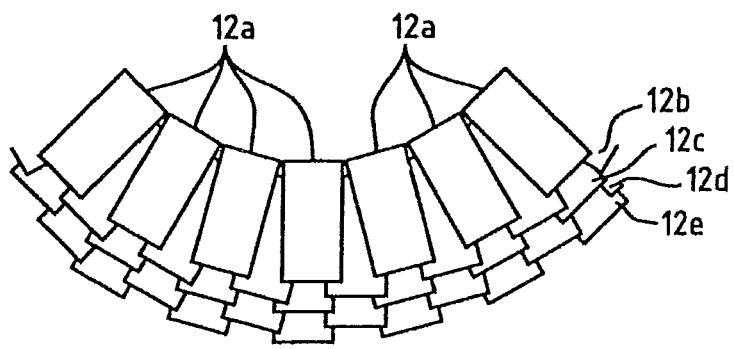
FIG. 6 shows an arrangement of a plurality of roving rows in a segment of a circle-like arrangement.

In the view in FIG. 6, the roving pieces 12a to 12e are arranged in the form of a segment of a circle. This is to demonstrate that the invention is not limited to the arrangement of rows of roving pieces, which run in a straight line transversely to the web-like carrier material, not shown here. Many other desired arrangements of rows of roving pieces could rather be formed here.

It is decisive in relation to the prior art that the rovings are always applied to a two-dimensional carrier material and fastened in such a way that their mobility is sufficient for a later deforming process, whether this is two-dimensional or three-dimensional. This allows the process of covering the web-like carrier materials with the roving pieces to be made significantly more productive. Moreover, the requirements of a laying device are significantly lower.

The process of spreading apart ropes, the cutting to length of the roving pieces and optionally the covering of the web-like carrier material with a binder, can take place analogously to DE 10 2007 012 609 A1. There are also no requirements going beyond the prior art for the preparation and the implementation of the later resin infusion process.

LIST OF REFERENCE NUMERALS 1. web-like carrier material
2. roving piece
3. fixing region
4. roving piece
5. adhesion point
6. web-like carrier material
7. roving piece
8. spread
9. stitching
10. roving piece
11. roving piece
12. roving piece

What is claimed is:

1. Method for producing a textile semi-finished product for a textile fiber composite structure, which comprises roving pieces (2, 4, 7, 10, 11, 12) with a defined length and width, the roving pieces (2, 4, 7, 10, 11, 12) being deposited at a defined position depending on the end product and overlapping, characterized in that the roving pieces (2, 4, 7, 10, 11, 12) are arranged and fixed with one end at a defined angle to a reference axis adjacent to one another on a plastically deformable flat carrier material (1, 6), in that after a depositing of a first row of roving pieces (2, 4, 7, 10, 11, 12), in rows following this, the depositing of the roving pieces (2, 4, 7, 10, 11, 12) takes place in such a way that the ends of the roving pieces that are in each case not connected to the carrier material (1, 6) overlap the previously deposited roving pieces (2, 4, 7, 10, 11, 12) in the manner of roof tiles or scales, the roving pieces not being connected to one another to ensure a mutual displaceability.

2. Method according to claim 1, characterized in that the carrier material (1, 6) has adhesive properties, by means of which the roving pieces are fixed.

3. Method according to claim 2, characterized in that at least on the surface of the carrier material (1), its adhesive properties can be thermally activated.

4. Method according to claim 1, characterized in that the roving pieces (2, 4, 7, 10, 11, 12) are adhesively equipped in the region, in which they come into contact with the carrier material (1, 6).

5. Method according to claim 4, characterized in that the adhesive equipping of the roving pieces (4, 7) is only at points.

6. Method according to claim 1, characterized in that during the production of the textile semi-finished product, no connection is produced directly between the roving pieces (2, 4, 7, 10, 11, 12).

7. Method according to claim 1, characterized in that after the completion of the roving arrangement on the carrier material, the composite of carrier material and roving arrangement is draped into the desired spatial shape.

8. Method according to claim 7, characterized in that the arrangement of the roving pieces (2, 4, 7, 10, 11, 12) before the draping on the carrier material (1, 6) takes place according to corresponding advance calculation in such a way that they adopt, after the draping, their optimised position with respect to the provided force flow in the end product.

9. Method according to claim 8, characterized in that the textile semi-finished product, after its shaping, is prepared for a resin infusion process known per se to form the fiber composite structure.

10. Textile semi-finished product for a textile fiber composite structure, which comprises roving pieces (2, 4, 7, 10, 11, 12) with a defined length and width, the roving pieces (2, 4, 7, 10, 11, 12) being deposited at a defined position depending on the end product and overlapping, characterized in that the roving pieces (2, 4, 7, 10, 11, 12) are arranged at a defined angle to a reference axis adjacent to one another in rows, in each case, and are fixed by one end on a plastically deformable flat carrier material (1, 6), and in that the roving pieces of the adjacent rows are deposited in such a way that ends of the roving pieces in each case not connected to the carrier material (1, 6) overlap the roving pieces of the adjacent rows in the manner of roof tiles or scales without mutual fixing.

\* \* \* \* \*